(12) United States Patent
Dunton et al.

(10) Patent No.: US 8,209,609 B2
(45) Date of Patent: Jun. 26, 2012

(54) AUDIO-VISUAL SEARCH AND BROWSE INTERFACE (AVSBI)

(75) Inventors: Randy R. Dunton, Phoenix, AZ (US); Cristobal A. Alvarez Russell, Atlanta, GA (US)

(73) Assignee: Intel Corporation, Santa Clara, CA (US)

( * ) Notice: Subject to any disclaimer, the term of this patent is extended or adjusted under 35 U.S.C. 154(b) by 717 days.

(21) Appl. No.: 12/343,043

(22) Filed: Dec. 23, 2008

(65) Prior Publication Data

US 2010/0162116 A1 Jun. 24, 2010

(51) Int. Cl.
G06F 3/00 (2006.01)
(52) U.S. Cl. ......... 715/716; 715/974; 715/833; 381/306
(58) Field of Classification Search .................. 715/716, 715/833, 794, 974; 381/306
See application file for complete search history.

(56) References Cited

U.S. PATENT DOCUMENTS

| 6,950,623 | B2 * | 9/2005 | Brown et al. ................. 455/3.01 |
| 7,492,913 | B2 * | 2/2009 | Connor et al. .................. 381/77 |
| 7,783,594 | B1 * | 8/2010 | Pachikov ...................... 707/609 |
| 2002/0016643 | A1 * | 2/2002 | Sakata ............................ 700/94 |
| 2002/0051010 | A1 | 5/2002 | Jun et al. |
| 2005/0249373 | A1 * | 11/2005 | Yamashita ..................... 381/334 |
| 2005/0271219 | A1 * | 12/2005 | Bruelle-Drews ............... 381/86 |
| 2006/0064716 | A1 | 3/2006 | Sull et al. |
| 2006/0067534 | A1 * | 3/2006 | Mizuta et al. ..................... 381/1 |
| 2006/0221776 | A1 * | 10/2006 | Roman et al. ..................... 369/1 |
| 2006/0253782 | A1 * | 11/2006 | Stark et al. .................... 715/727 |
| 2007/0104341 | A1 * | 5/2007 | Kondo et al. ................. 381/306 |
| 2007/0174774 | A1 | 7/2007 | Lerman et al. |
| 2007/0222769 | A1 * | 9/2007 | Otsuka et al. ................. 345/173 |
| 2008/0025529 | A1 * | 1/2008 | Keohane et al. .............. 381/104 |
| 2008/0046937 | A1 * | 2/2008 | Smith et al. ...................... 725/89 |
| 2008/0222546 | A1 * | 9/2008 | Mudd et al. ................... 715/765 |
| 2008/0253577 | A1 * | 10/2008 | Eppolito .......................... 381/17 |
| 2008/0253592 | A1 * | 10/2008 | Sanders et al. ................ 381/306 |
| 2009/0010403 | A1 * | 1/2009 | Jorgensen et al. ......... 379/88.23 |
| 2009/0119614 | A1 * | 5/2009 | Tienvieri et al. ............. 715/786 |
| 2010/0058238 | A1 * | 3/2010 | Ben Moshe ................... 715/818 |

FOREIGN PATENT DOCUMENTS

| KR | 20030059503 A | 7/2003 |
| WO | 2010074952 A1 | 7/2010 |

OTHER PUBLICATIONS

International Preliminary Report on Patentability from corresponding PCT application No. PCT/US2009/067095, mailed Jul. 7, 2011.

* cited by examiner

Primary Examiner — Patrick Riegler
(74) Attorney, Agent, or Firm — Garrett IP, LLC

(57) ABSTRACT

An audio-visual search and browse interface (AVSBI) is described. In an embodiment, a user interface module displays one or more media collections, where each of the one or more media collections includes multiple clips of media. The user interface module determines a center media collection from the one or more media collections that corresponds with a slider on a user interface display. The user interface module determines a left media collection and a right media collection based on the center media collection. The multiple clips of media in the center media collection are played via a center speaker, the multiple clips of media in the left media collection are played via a left speaker, and the multiple clips of media in the right media collection are played via a right speaker, all in a simultaneous, overlapping and cyclical manner. Other embodiments are described and claimed.

18 Claims, 8 Drawing Sheets

AUDIO-VISUAL SEARCH AND BROWSE INTERFACE (AVSBI)

BACKGROUND

Consumer electronics and processing systems are converging. Consumer electronics such as televisions and media centers are evolving to include processing capabilities typically found on a computer. The increase in processing capabilities may allow consumer electronics to execute more sophisticated system and application programs. Such programs typically require robust user interfaces, capable of displaying and navigating through ever increasing amounts of information. Accordingly, there may be a need for improved techniques to solve these and other problems.

DETAILED DESCRIPTION

Figure 1:
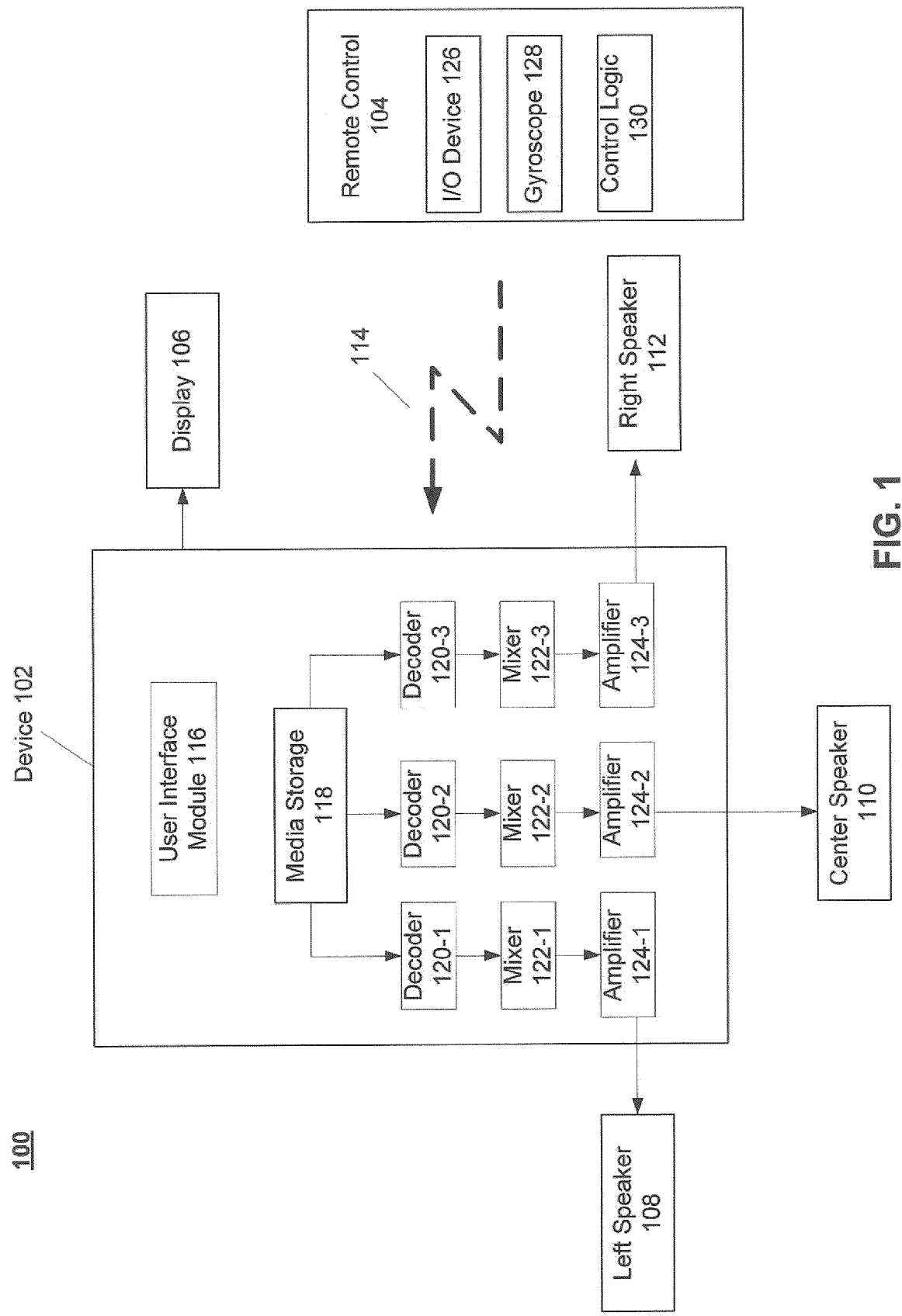
FIG. 1 illustrates one embodiment of a system.

Various embodiments may be directed to an audio-visual search and browse interface (AVSBI) for fast searching and/or browsing of audio and/or visual content. Today's digital home environment provides the opportunity for hundreds or thousands of media content stored throughout a home network. Due to the number of available media content, it may be particularly burdensome for a user to browse or search through the content.

Embodiments of the AVSBI combine a visual and navigable representation of a set of media collections along with a quick audio sampling of the media itself. Embodiments of the audio sampling involve playing multiple media collections in simultaneous manner, each collection being outputted on a different speaker in a surround sound type of setting. In embodiments, the media collections are not only played in a simultaneous manner, but also in an overlapping and cyclical manner within each of the collections themselves, with a selected clip or track of media being the focus at any given time.

In embodiments, the AVSBI may provide for the media collections to be displayed in a horizontal manner on a user interface display. A user may navigate through the media collections via a slider, where each media collection is represented as a still image. The still image helps to quickly inform the user about the particular media collection, as well as the neighboring media collections, at a glance.

As mentioned above, embodiments of the audio sampling involve playing multiple media collections in simultaneous manner, each collection being outputted on a different speaker in a surround sound type of setting. In embodiments, the media collection that corresponds with a slider in some fashion (e.g., positioned directly below the slider) on a user interface display is played via a center speaker. The media collection positioned directly to the left of the center media collection is played via a left speaker. The media collection positioned directly to the right of the center media collection is played via a right speaker. In embodiments, the slider includes a left arrow and a right arrow. If the user moves the slider to navigate through the media collections, the audio output of the media collections moves through the speakers based on the position of the slider on the user interface display.

In embodiments, a still image (e.g., movie poster) representing a clip of a movie sound track in a media collection may progress from a still image to a mixed and overlapping (fades) series of out-takes of the video that is displayed in a synchronous manner with the soundtrack via speakers, as discussed above. Other embodiments are described and claimed.

Various embodiments may include a fast browsing mode user interface arranged to accept user input from a remote control. For example, the user interface module may be arranged to receive movement information representing pointing movements of the remote control. The remote control may be arranged to provide movement information as a user moves the remote control through space, such as moving the remote control to point to different objects displayed on a screen. In this manner, a user may enter information into a media device such as a television or set top box using the remote control as an "air" mouse or free-form pointing device. Alternatively, a user may provide movement information to the user interface module using other pointing devices implemented as either separate from the remote control or integrated with the remote control. The embodiments are not limited in this context.

Various embodiments may comprise one or more elements or components. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 illustrates one embodiment of a system 100 in which embodiments of the invention may operate. Referring to FIG. 1, system 100 may include a device 102, a remote control 104, a display 106, a left speaker 108, a center speaker 110, a right speaker 112 and a communications media 114. Device 102 may include a user interface module 116, media storage 118, one or more decoders 120, one or more mixers 122, and one or more amplifiers 124. Remote control 104 may include an input/output (I/O) device 126, a gyroscope 128 and control logic 130. Each of these elements is described next in more detail.

In one embodiment, for example, device 102 is a media processing system that may include various application programs, such as user interface module 116. For example, user interface module 116 may comprise a graphic user interface (GUI) to communicate information between a user and device 102. User interface module 116 may be used to facilitate embodiments of the AVSBI to navigate through large amounts of media content, for example, via a networked digital home environment.

Embodiments of the AVSBI combine a visual and navigable representation of a set of media collections along with a quick audio sampling of the media itself. In embodiments, each media collection includes multiple clips or tracks of media content. Media collections may be stored in media storage 118, but embodiments are not limited to this. One or more media collections may be stored anywhere in a network, for example, that is accessible to device 102.

Media storage 118 may store any type of content or data. Examples of content may generally include any data or signals representing information meant for a user, such as media information, voice information, video information, audio information, image information, textual information, numerical information, alphanumeric symbols, graphics, and so forth. The embodiments are not limited in this context.

Embodiments of the AVSBI rely on the idea of listening to many small samples of clips or tracks of audio in collections simultaneously and at a fairly high pace. In contrast with other senses, the human brain is capable of isolating and processing multiple audio data streams and thus enables one to browse large amounts of audio data effectively at the same time. Here, a user is able to quickly browse a very large set of audio data streams or media data streams and to search for a particular audio/media clip based on a sample of the audio in the user's mind that he or she may have heard at some point in the past.

Embodiments of the AVSBI take advantage of spatial capabilities for both navigation and sorting. This helps the user to more easy recall where a piece of media that he or she has accessed in the past may be currently located. In addition, using spatial mapping to convey the notion of sorting helps to make it easier for the user to predict where a piece of media with certain characteristics may be located. Embodiments of the AVSBI uses horizontal scrolling and surround sound technology to implement spatial navigation and sorting of media content. Embodiments are not limited in this context.

Embodiments of the audio sampling involve playing multiple media collections in a simultaneous manner, each collection being outputted on a different speaker in a surround sound type of setting. In embodiments, the media collections are not only played in a simultaneous manner, but also in an overlapping and cyclical manner within each of the collections themselves, with a selected clip or track of media being the focus at any given time.

Referring to FIG. 1, in embodiments, the three speakers are continuously playing audio through three separate audio pipelines as shown. For example, left speaker 108 uses a pipeline with decoder 120-1, mixer 122-1 and amplifier 124-1. Center speaker 110 uses a pipeline with decoder 120-2, mixer 122-2 and amplifier 124-2. Right speaker 112 uses a pipeline with decoder 120-3, mixer 122-3 and amplifier 124-3. In embodiments, at any given time there may be two or more audio clips or tracks being decoded per speaker. Here, each decoder reads the audio clip or track from a storage media (for example, storage 118) and decodes it. The two or more audio clips or tracks are then mixed or braided via the mixer, as will be described further below. Finally, the mixed or braided audio is sent to the amplifier and speaker. Although FIG. 1 illustrates three speakers, embodiments are not limited to this and may use any number of speakers.

Figure 2:
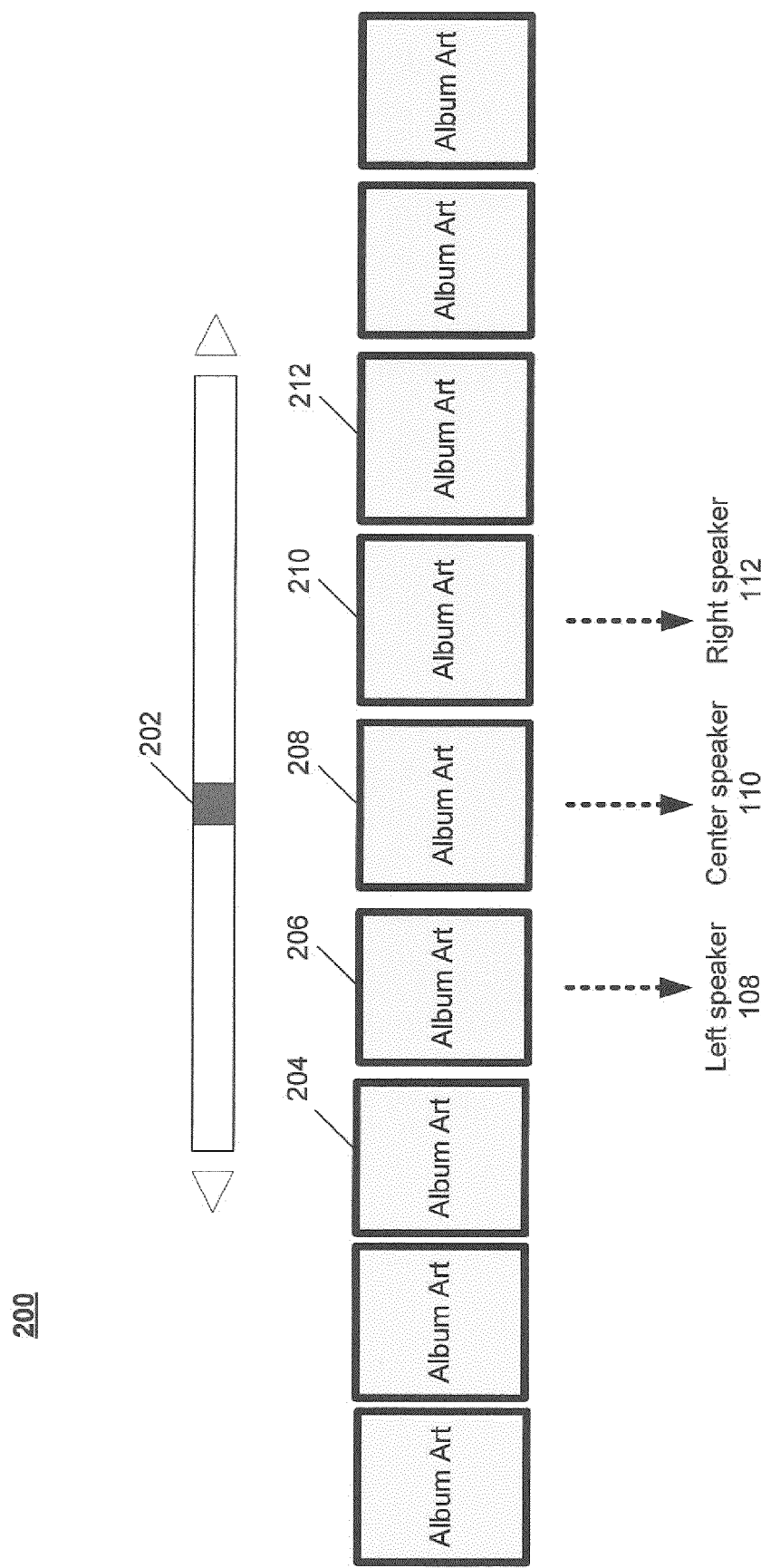
FIG. 2 illustrates one embodiment of a user interface display.

In embodiments, the AVSBI may provide for the media collections to be displayed in a horizontal manner on a user interface display. One example of such a user interface display 200 is illustrated in FIG. 2. User interface display 200 may be implemented via user interface module 116.

Referring to FIG. 2, a user may navigate through the media collections (e.g., media collections 204, 206, 208, 210, 212, and so forth) via a slider 202 (or pointer or cursor, for example), where each media collection is represented as a still image. The still image helps to quickly inform the user about the particular media collection, as well as the neighboring media collections, at a glance. Although FIG. 2 illustrates the media collections organized in a horizontal fashion, this is not meant to limit embodiments of the invention. In fact, the media collections may be presented in any manner including, but not limited to, vertically, stacked, diagonally, overlapped, and so forth. Embodiments of the invention are not limited in this context.

In embodiments, assuming that each media collection represents audio samples from a particular album, the still image may be a picture of the album art from the album itself, as illustrated in FIG. 2. In embodiments, the user may scroll through the media collections or albums in a real-time animated fashion.

The media collections (e.g., albums) themselves may be ordered or sorted according to some criterion of the media collection in general or according to the individual clips, tracks or samples in the media collection. For example, a possible ordering may be classic rock music albums first, followed by alternative music albums next, followed by country music albums, and so forth. Albums may also be ordered or sorted based on any other criteria. For example, the albums could be sorted based on the artist, record label, a user defined sort, year released, based on intrinsic characteristics of the audio content, metadata, genre, predefined playlists, the extrinsic qualities of the media file itself (e.g., bit rate, compression technique, format, etc.), an ordering obtained through an existing music genome framework, and so forth. Embodiments are not limited in this context.

Referring again to FIG. 2, in embodiments, media collection 208 (or album) is positioned directly below slider 202 and is played via center speaker 110 (FIG. 1). Media collection 206 is positioned directly to the left of center media collection 208 and is played via left speaker 108. Media collection 210 is positioned directly to the right of center media collection 208 and is played via right speaker 112. Embodiments are not limited to the center media collection being determined as the media collection positioned directly below slider 202. For example, in embodiments, the center media collection is determined to be a media collection corresponding with slider 202 in any predetermined fashion.

As the user moves slider 202 to navigate through the media collections, the audio output of the media collections moves through the speakers based on the position of slider 202 on user interface display 200. In embodiments, slider 202 includes a left arrow and a right arrow, as is illustrated in FIG. 2. For example, if the right arrow was activated once (or slider 202 moved to the right over media collection 210), then media collection 210 would start playing via center speaker 110, media collection 208 would start playing via left speaker 108 and media collection 212 would start playing via right speaker 112. Alternatively, if the left arrow was activated once (or slider 202 moved to the left over media collection 206), media collection 206 would start playing via center speaker 110, media collection 204 would start playing via left speaker 108 and media collection 208 would start playing via right speaker 112. Thus, as the user scrolls through the set of media collections, the media playback of the collections also moves gradually from one speaker to the next in the direction of the scrolling. In this way, embodiments add a spatial component to the audio search and browse that take advantage of surround sound technology. Embodiments are not limited in this context.

In embodiments, the media collections are not only played in a simultaneous manner via speakers 108, 110 and 112, but also in an overlapping and cyclical manner or "braided" manner within each of the collections themselves, with a selected clip or track of media being the focus at any given time. In embodiments, multiple segments of the audio clips or tracks (selected, for example, from the middle of each clip via an algorithm) play at once with a low volume, while one of them (the one currently in focus) is played louder than the rest. This focus switches gradually from clip to clip in the media collection in an ordered, overlapping, and cyclical manner.

In embodiments, for each collection, an ordering for the media clips or tracks is determined. In embodiments, this ordering may be the default ordering of the clips or tracks in the album when the media collection represents an album, for example.

In embodiments, the degrees of separation for the clips or tracks determine the overlapping of the clips. Here, various methods can be used to overlap the individual clips. For example, with 180 degrees of separation at most two clips can be heard at the same time from one speaker (i.e., two songs are mixed). With 120 degrees of separation at most three clips can be heard at the same time from one speaker (i.e., three songs are mixed). The number of clips to mix may be maximized to allow for a large number of songs to be mixed without confusing the listener.

In embodiments, based on the degree of separation, n clips or tracks are selected (e.g., 180 degrees of separation then two clips are selected and with 120 degrees of separation then three clips are selected). A clip to focus on is selected from the n clips. The selected clips are then played for a period of time, while focusing on the selected clip by playing it louder than other clips. Then, the process moves to the next n clips while overlapping with the previous n clips or tracks.

Figure 3:
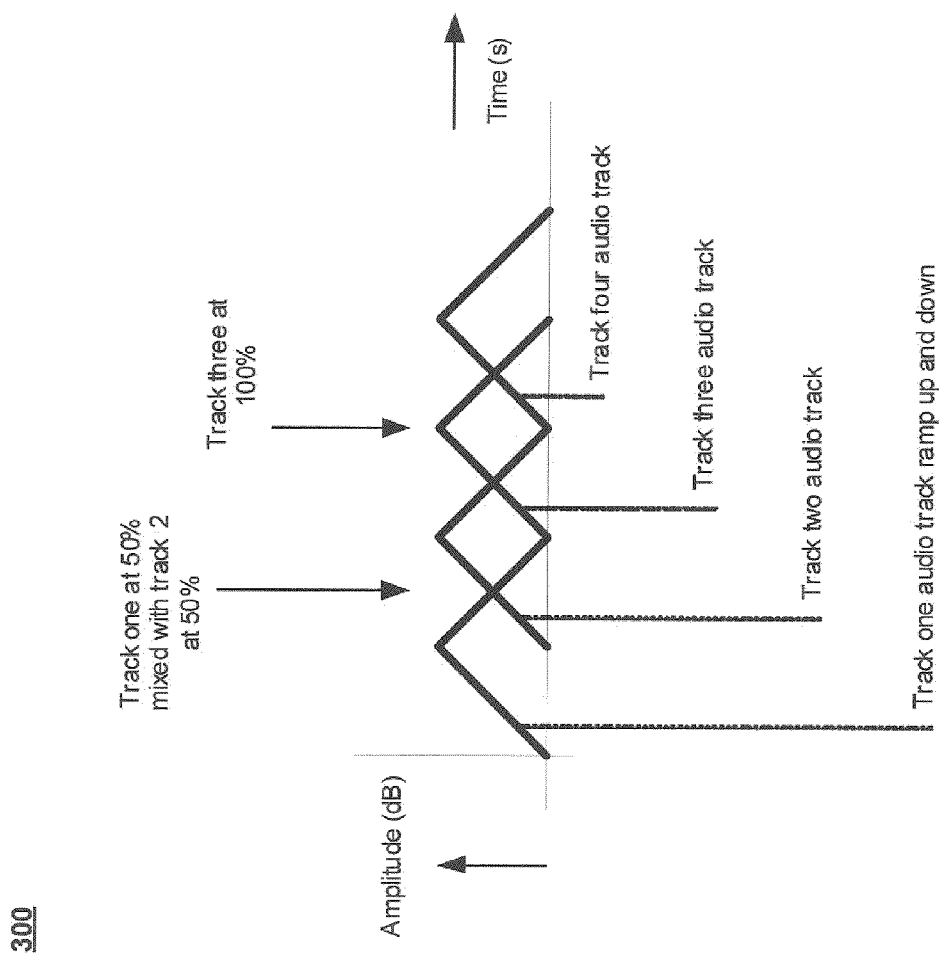
FIG. 3 illustrates one embodiment of a chart.

An embodiment of mixing the clips or tracks is illustrated in FIG. 3. Referring to FIG. 3, the mixing of clips or tracks over time is shown with 180 degrees of separation. Once the last clip or track has been included in the n clips, the cycle begins again starting with the first clip or track. In embodiments, to provide a better sampling of certain clips or tracks that may be at a low volume at a particular part of the track, the algorithm selects the middle of each track that may also have a random offset applied to the index into the track for each cycle through the media collection or album. Embodiments of the invention are not limited in this context.

In other embodiments, the individual clips or tracks in a media collection may represent something other than clips from the same album. Here, multiple clips may be grouped together in a media collection based on order of genre or beat, by artist, record label, year released, based on intrinsic characteristics of the audio content, metadata, predefined user playlists, the extrinsic qualities of the media file itself (e.g., bit rate, compression technique, format, etc.), an ordering obtained through an existing music genome framework, and so forth. Embodiments are not limited in this context.

Figure 4:
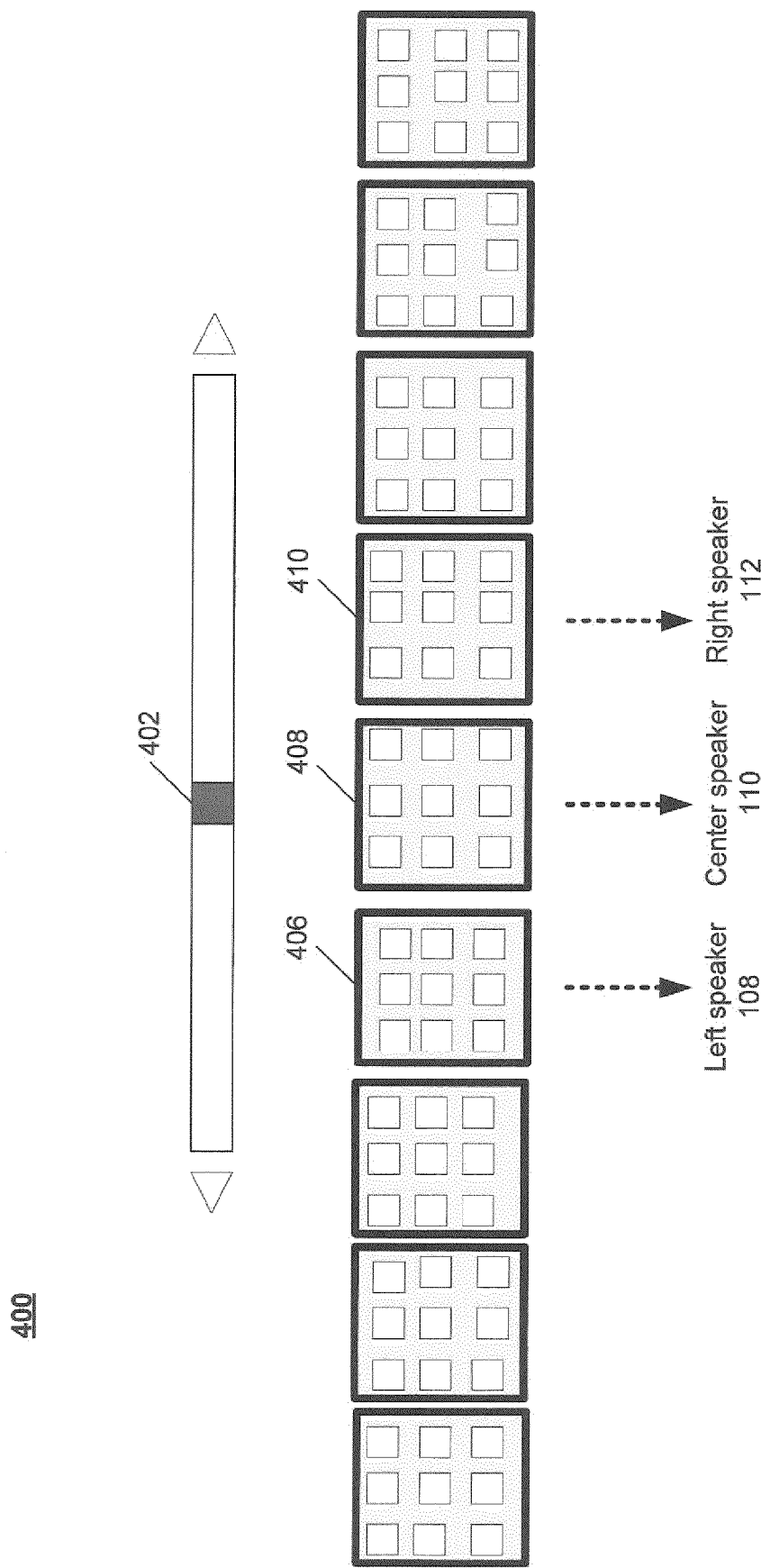
FIG. 4 illustrates one embodiment of a user interface display.

In an embodiment user interface display, the individual clips in the media collection may each belong to a different album, for example. Here, each clip may be represented by the album art from the album it belongs. The individual clips in the media collection may be arranged in a multi-row format within the media collection on the user interface display. An example user interface display 400 is shown in FIG. 4. Referring to FIG. 4, each smaller block within media collection 408, for example, represents a clip. Hence, media collection 408 includes nine clips arranged in a 3×3 group configuration (3 wide and 3 high).

Based on the position of slider 402, each of speakers 108, 110 and 112 will play a group of 3×3 clips using the same ordered, overlapping, and cyclical manner, as described above. For example, as shown in FIG. 3, the center 3×3 groups of clips (media collection 408) will be playing via center speaker 110 (FIG. 1). The left 3×3 groups of clips (media collection 406) will be playing via left speaker 108. The right 3×3 groups of clips (media collection 410) will be playing via right speaker 112. As slider 402 moves, so does the 3×3 groups of clips being played through the different speakers, as described above. Embodiments of the invention are not limited in this context. For example, there may be any number of clips per media collection in any configuration that is suited for embodiments of the invention.

Also, in embodiments, video may be added in addition to audio to search movie sound tracks, for example. In embodiments, a still image (e.g., movie poster) representing a clip of a movie sound track in a media collection may progress from a still image to a mixed and overlapping (fades) series of out-takes of the video that is displayed in a synchronous manner with the soundtrack via speakers, as discussed above.

Referring back to FIG. 1, in various embodiments, user interface module 116 may be arranged to receive user input via remote control 104. Remote control 104 may be arranged to allow a user to perform pointing operations similar to a mouse or other pointing device using gyroscope 128, for example. User interface module 116 and remote control 104 allow a user to control a pointer (or slider) on a display even when situated a relatively far distance from the display, such as normal viewing distance (e.g., 10 feet or more), and without the need for typical wired connections.

Remote control 104 may be arranged to control, manage or operate user interface module 116 by communicating control information using infrared (IR) or radio-frequency (RF) signals, for example. Various command codes may be assigned to one or more keys or buttons included with I/O device 126 for remote control 104. I/O device 126 may comprise various hardware or software buttons, switches, controls or toggles to accept user commands. For example, I/O device 126 may include a numeric keypad, arrow buttons, selection buttons, power buttons, mode buttons, selection buttons, menu buttons, and other controls needed to perform the normal control operations typically found in conventional remote controls. There are many different types of coding systems and command codes, and generally different manufacturers may use different command codes for controlling a given device.

In addition to I/O device 126, remote control 104 may also include elements that allow a user to enter information into a user interface at a distance by moving the remote control through the air in two or three dimensional space. For example, remote control 104 may include gyroscope 128 and control logic 130. In operation, a user may use remote control 104 to provide information for the user interface module 116 at a distance by moving remote control 104 through the air, similar to an air mouse. For example, a user may point remote control 104 to various objects displayed on display 106, for example. Gyroscope 128 may sense the movements of remote control 104, and send movement information representing the movements to a media processing node over communications media 114. User interface module 116 may receive the movement information, and move a pointer (e.g., mouse pointer) or cursor or slider in accordance with the movement information on display 106. User interface module 116 may use the movement information and associated selection commands to perform any number of user defined operations for a networked digital home network, such as navigating option menus, selecting options, searching for media content, selecting media objects, and so forth.

In addition to operating as an air mouse or pointing device using gyroscope 128 and control logic 130, remote control 104 may use other techniques to control a pointer or slider.

For example, remote control 104 may include an integrated pointing device. The pointing device may include various types of pointer controls, such as a track or roller ball, a pointing stick or nub, a joystick, arrow keys, direction keys, and so forth. Integrating a pointing device with remote control 104 may facilitate pointing operations for a user. Alternatively, a user may use a pointing device separate from remote control 104, such as various different types of mice or controllers. The pointing device may also be part of another device other than remote control 104, such as a wired or wireless keyboard. The particular implementation for the pointing device may vary as long as the pointing device provides movement information for the user interface module and allows a user to generate the movement information from a distance (e.g., normal viewing distance). The embodiments are not limited in this context.

Although embodiments of the invention described herein may be described as a home entertainment system or home network, this is not meant to limit the invention. Embodiments of the invention are applicable to any connected environment including, but not necessarily limited to, an office environment, research environment, hospital or institutional environment, and so forth.

In various embodiments, system 100 may be implemented as a wireless system, a wired system, or a combination of both. When implemented as a wireless system, system 100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Operations for the embodiments described herein may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments, however, are not limited to the elements or in the context shown or described in the figures.

Figure 5:
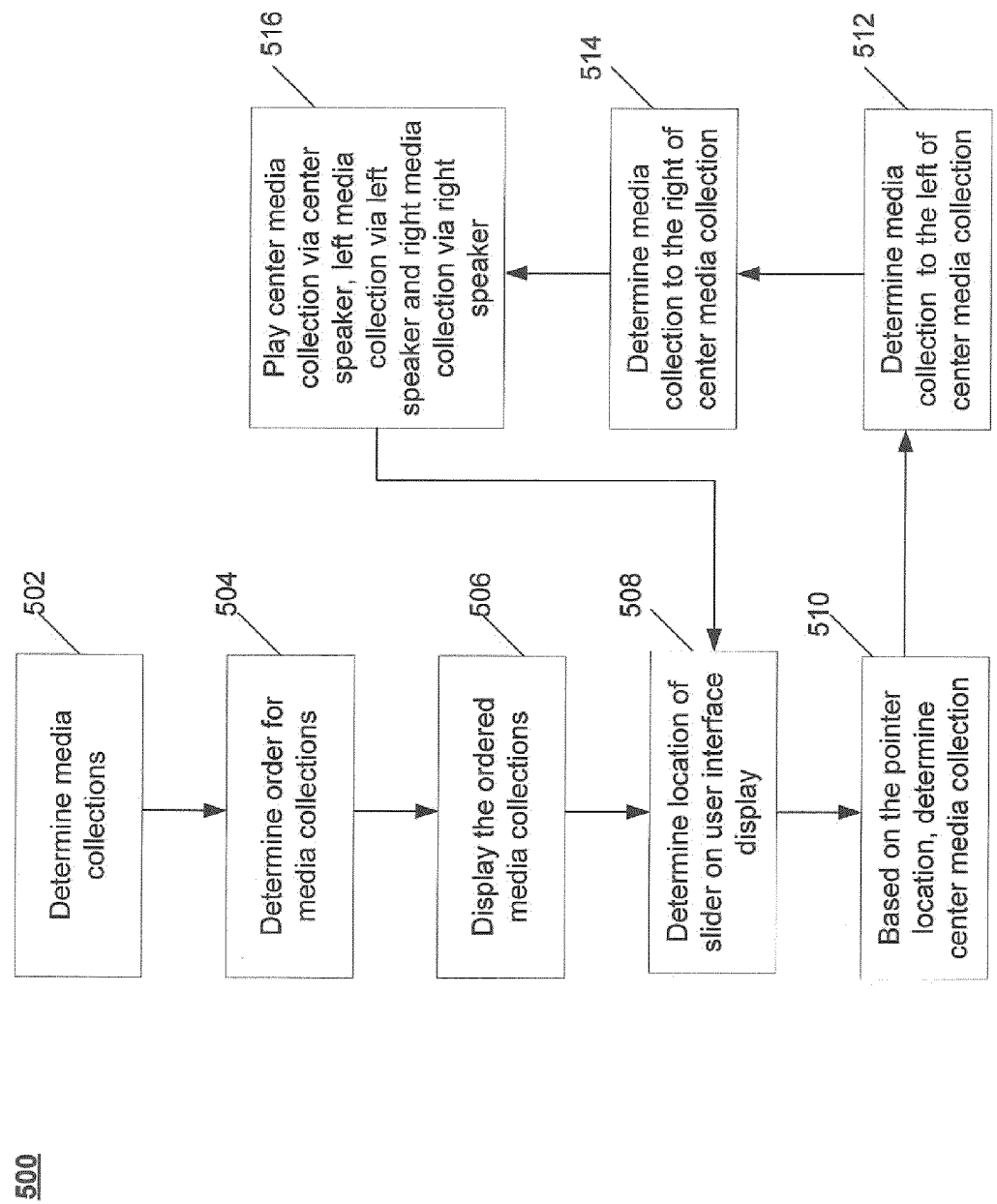
FIG. 5 illustrates one embodiment of a logic flow.

FIG. 5 illustrates one embodiment of a logic flow 500. Each of the blocks in logic flow 500 was described in more detail above and details of such will not be repeated. As shown in logic flow 500, the various media collections are determined (block 502). An order for the media collections is determined (block 504). The ordered media collections are displayed on a user interface display (block 506). The location of a slider is determined on the user interface display (block 508). Based on the slider location, the center media collection is determined (block 510). The media collection to the left of the center media collection is determined (block 512). The media collection to the right of the center media collection is determined (block 514). The center media collection is played via the center speaker, the left media collection is played via the left speaker and the right media collection is played via the right speaker (block 516). As the slider moves in the user interface display, the processing is returned to block 508 to determine the location of the slider on the user interface display. The embodiments are not limited in this context.

Figure 6:
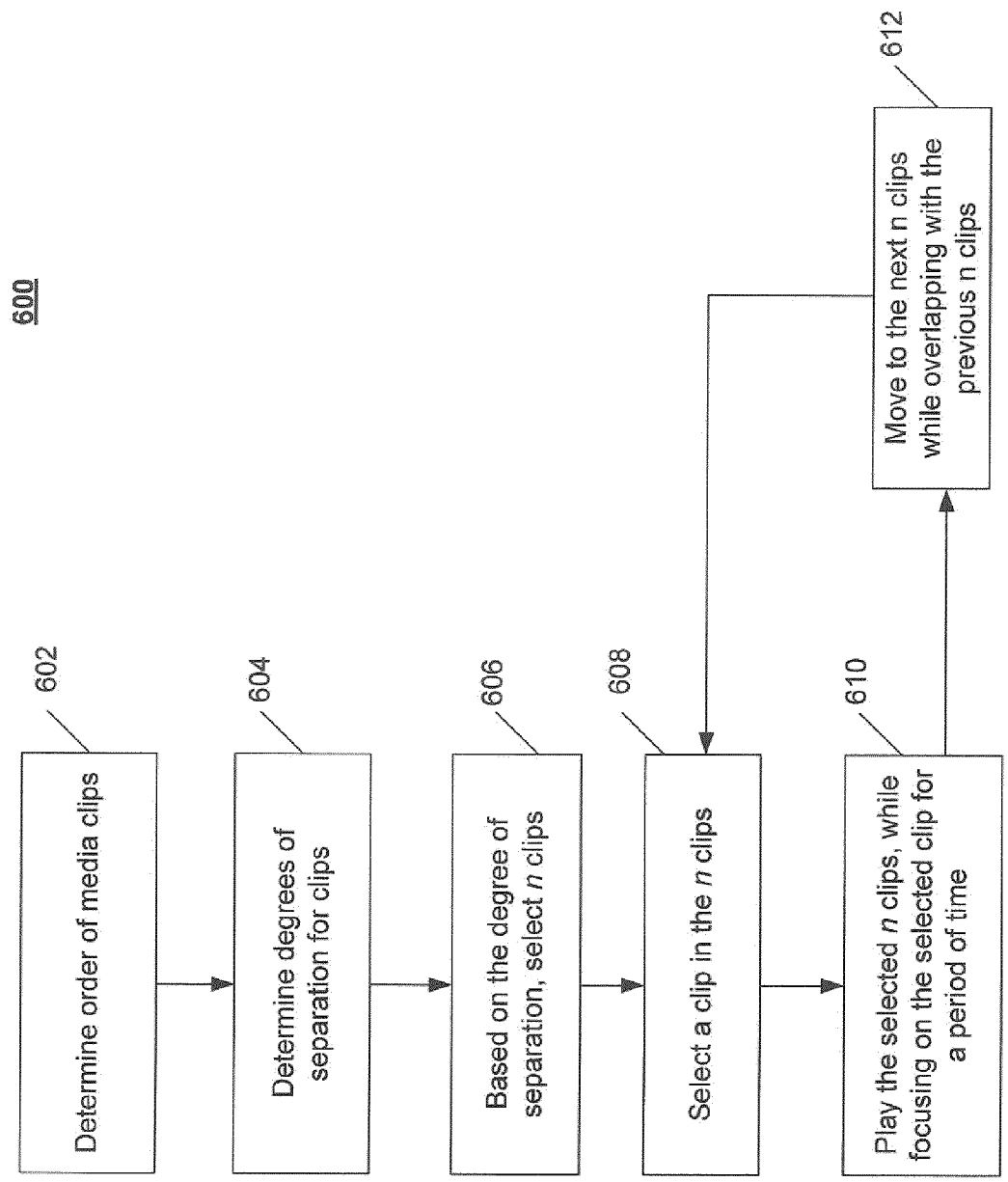
FIG. 6 illustrates one embodiment of a logic flow.

FIG. 6 illustrates one embodiment of a logic flow 600. Each of the blocks in logic flow 600 was described in more detail above and details of such will not be repeated. As shown in logic flow 600, the order for the clips or tracks within a particular media collection is determined (block 602). The degree of separation for the clips is determined (block 604). Based on the degree of separation, n clips are selected (block 606). A clip to focus on is selected from the n clips (block 608). The n clips are played via their respective speaker, while focusing on the selected clip for a period of time (e.g., the selected clip is played louder than the other n clips) (block 610). The next n clips are then played while overlapping with the previous n clips (block 612). Processing returns to block 608. Embodiments of the invention are not limited in this context.

Figure 7:
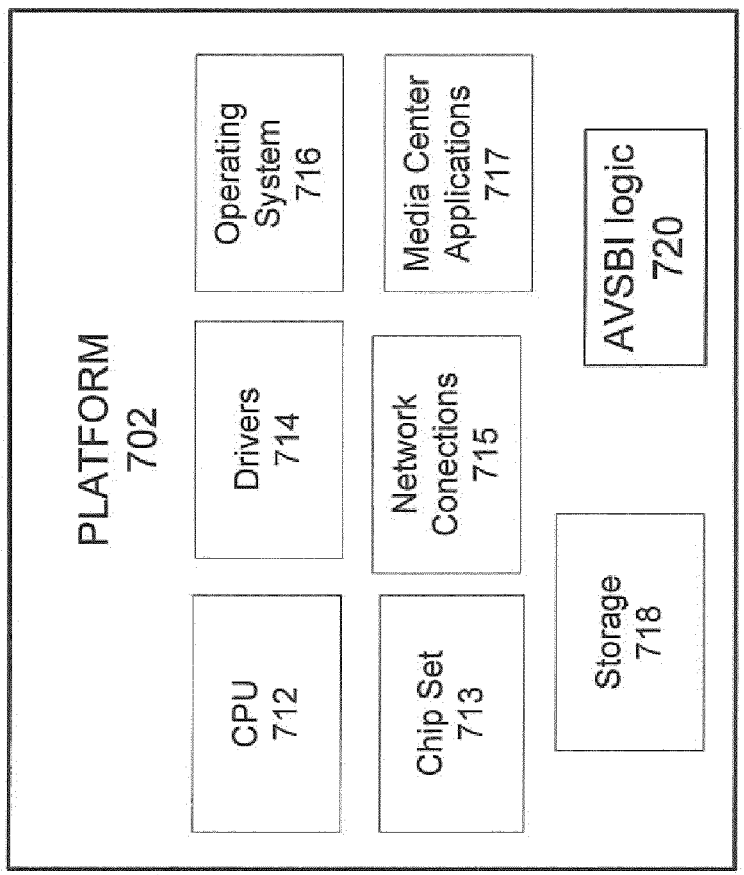
FIG. 7 illustrates one embodiment of a system.

FIG. 7 illustrates an embodiment of a platform 702 in which functionality of the present invention as described herein may be implemented. In one embodiment, platform 702 may comprise or may be implemented as a media platform 702 such as the Viiv™ media platform made by Intel® Corporation. In one embodiment, platform 702 may interact with a remote control (such as remote control 104 from FIG. 1).

In one embodiment, platform 702 may comprise a CPU 712, a chip set 713, one or more drivers 714, one or more network connections 715, an operating system 716, and/or one or more media center applications 717 comprising one or more software applications, for example. Platform 702 also may comprise storage 718 and AVSBI logic 720.

In one embodiment, CPU 712 may comprise one or more processors such as dual-core processors. Examples of dual-core processors include the Pentium® D processor and the Pentium® processor Extreme Edition both made by Intel® Corporation, which may be referred to as the Intel Core Duo® processors, for example.

In one embodiment, chip set 713 may comprise any one of or all of the Intel® 945 Express Chipset family, the Intel® 955X Express Chipset, Intel® 975X Express Chipset family, plus ICH7-DH or ICH7-MDH controller hubs, which all are made by Intel® Corporation.

In one embodiment, drivers 714 may comprise the Quick Resume Technology Drivers made by Intel® to enable users to instantly turn on and off platform 702 like a television with the touch of a button after initial boot-up, when enabled, for example. In addition, chip set 713 may comprise hardware and/or software support for 5.1 surround sound audio and/or high definition 7.1 surround sound audio, for example. Drivers 714 may include a graphics driver for integrated graphics platforms. In one embodiment, the graphics driver may comprise a peripheral component interconnect (PCI) Express graphics card.

In one embodiment, network connections 715 may comprise the PRO/1000 PM or PRO/100 VE/VM network connection, both made by Intel® Corporation.

In one embodiment, operating system 716 may comprise the Windows® XP Media Center made by Microsoft® Corporation. In other embodiments, operating system 716 may comprise Linux®, as well as other types of operating systems. In one embodiment, one or more media center applications 717 may comprise a media shell to enable users to interact with a remote control device from a distance of about 10-feet away from platform 702 or a display device, for example. In one embodiment, the media shell may be referred to as a "10-feet user interface," for example. In addition, one or more media center applications 717 may comprise the Quick Resume Technology made by Intel®, which allows instant on/off functionality and may allow platform 702 to stream content to media adaptors when the platform is turned "off."

In one embodiment, storage 718 may comprise the Matrix Storage technology made by Intel® to increase the storage performance enhanced protection for valuable digital media when multiple hard drives are included. In embodiments, AVSBI logic 720 is used to enable the functionality of embodiments of the invention as described herein.

Platform 702 may establish one or more logical or physical channels to communicate information. The information may include media information and control information. Media information may refer to any data representing content meant for a user. Control information may refer to any data representing commands, instructions or control words meant for an automated system. For example, control information may be used to route media information through a system, or instruct a node to process the media information in a predetermined manner. In embodiments, device platform 702 may be implemented as part of a wired communication system, a wireless communication system, or a combination of both. The embodiments, however, are not limited to the elements or in the context shown or described in FIG. 7.

Figure 8:
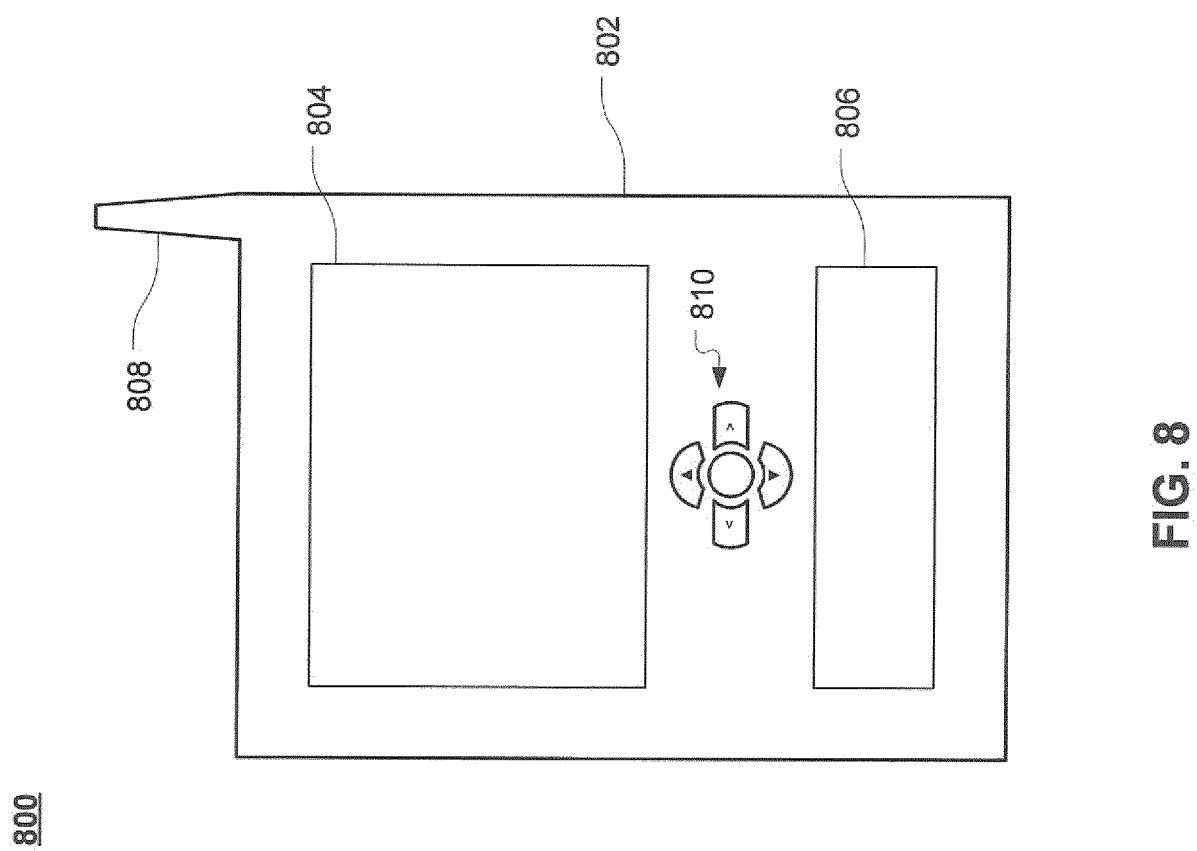
FIG. 8 illustrates one embodiment of a device.

FIG. 8 illustrates one embodiment of a device 800 in which functionality of the present invention as described herein may be implemented. In one embodiment, for example, device 800 may comprise a communication system. In various embodiments, device 800 may comprise a processing system, computing system, mobile computing system, mobile computing device, mobile wireless device, computer, computer platform, computer system, computer sub-system, server, workstation, terminal, personal computer (PC), laptop computer, ultra-laptop computer, portable computer, handheld computer, personal digital assistant (PDA), cellular telephone, combination cellular telephone/PDA, smart phone, pager, one-way pager, two-way pager, messaging device, blackberry, and so forth. The embodiments are not limited in this context.

In embodiments, device 800 may be implemented as part of a wired communication system, a wireless communication system, or a combination of both. In one embodiment, for example, device 800 may be implemented as a mobile computing device having wireless capabilities. A mobile computing device may refer to any device having a processing system and a mobile power source or supply, such as one or more batteries, for example.

Examples of a mobile computing device may include a laptop computer, ultra-laptop computer, portable computer, handheld computer, palmtop computer, personal digital assistant (PDA), cellular telephone, combination cellular telephone/PDA, smart phone, pager, one-way pager, two-way pager, messaging device, data communication device, and so forth.

In one embodiment, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may comprise a housing 802, a display 804, an input/output (I/O) device 806, and an antenna 808. Device 800 also may comprise a five-way navigation button 810. I/O device 806 may comprise any suitable I/O device for entering information into a mobile computing device. Examples for I/O device 806 may include an alphanumeric keyboard, a numeric keypad, a touch pad, input keys, buttons, switches, rocker switches, a speaker, voice recognition device and software, and so forth. Information also may be entered into device 800 by way of microphone. Such information may be digitized by a voice recognition device. Display 804 may comprise any suitable display unit for displaying information appropriate for a mobile computing device. Device 800 may incorporate or have access to AVSBI logic to enable the functionality of the embodiments of the invention described herein. The embodiments, however, are not limited to the elements or in the context shown or described in FIG. 8.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multicore processor. In a further embodiment, the functions may be implemented in a consumer electronics device.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a user interface module configured to display one or more media collections, wherein each of the one or more media collections is configured to include multiple clips of media, wherein the user interface module is configured to determine a center media collection from the one or more media collections that corresponds with a slider on a user interface display, wherein the user interface module is configured to determine a left media collection and a right media collection based on the center media collection, wherein the multiple clips of media in the center media collection are configured to be played via a center speaker, wherein the multiple clips of media in the left media collection are configured to be played via a left speaker, wherein the multiple clips of media in the right media collection are configured to be played via a right speaker, wherein the multiple clips of media in the center media collection, the left media collection, and the right media collection are configured to be played simultaneously to facilitate a search of the one or more media collections, and wherein the multiple clips of media in the center media collection are configured to be played in a first overlapping and cyclical manner with a first selected clip being the focus at a first given time, wherein the multiple clips of media in the left media collection are configured to be played in a second overlapping and cyclical manner with a second selected clip being the focus at a second given time, and wherein the multiple clips of media in the right media collection are configured to be played in a third overlapping and cyclical manner with a third selected clip being the focus at a third given time.

2. The apparatus of claim 1, wherein the first selected clip, the second selected clip, and the third selected clip are configured to be played louder than the other clips.

3. The apparatus of claim 1, wherein a first audio output at the center speaker, a second audio output at the left speaker, and a third audio output at the right speaker are configured to change based on a position of the slider.

4. The apparatus of claim 1, wherein the one or more media collections are displayed in a horizontal format on the user interface display.

5. The apparatus of claim 1, wherein the multiple clips of media in each of the media collections are included in a same album and wherein each of the media collections is configured to be represented visually in the user interface display.

6. The apparatus of claim 1, wherein the multiple clips of media in each of the media collections are configured to represent content that satisfy a criterion and wherein each of the multiple clips of media is configured to be represented visually in the user interface display.

7. A method, comprising:
displaying one or more media collections in a user interface display, wherein each of the one or more media collections is configured to include multiple clips of media;
determining a center media collection from the one or more media collections that corresponds with a slider on the user interface display;
determining a left media collection based on the center media collection;
determining a right media collection based on the center media collection;
playing the multiple clips of media in the center media collection via a center speaker;
playing the multiple clips of media in the left media collection via a left speaker; and
playing the multiple clips of media in the right media collection via a right speaker, wherein the multiple clips of media in the center media collection, the left media collection, and the right media collection are configured to be played simultaneously to facilitate a search of the one or more media collections and wherein the multiple clips of media in the center media collection are configured to be played in a first overlapping and cyclical manner with a first selected clip being the focus at a first given time, wherein the multiple clips of media in the left media collection are configured to be played in a second overlapping and cyclical manner with a second selected clip being the focus at a second given time, and wherein the multiple clips of media in the right media collection are configured to be played in a third overlapping and cyclical manner with a third selected clip being the focus at a third given time.

8. The method of claim 7, wherein the first selected clip, the second selected clip, and the third selected clip are configured to be played louder than the other clips.

9. The method of claim 7, wherein a first audio output at the center speaker, a second audio output at the left speaker, and a third audio output at the right speaker are configured to change based on a position of the slider.

10. The method of claim 7, wherein the one or more media collections are displayed in a horizontal format on the user interface display.

11. The method of claim 7, wherein the multiple clips of media in each of the media collections are included in a same album and wherein each of the media collections is configured to be represented visually in the user interface display.

12. The method of claim 7, wherein the multiple clips of media in each of the media collections are configured to represent content that satisfy a criterion and wherein each of the multiple clips of media is configured to be represented visually in the user interface display.

13. A non-transitory machine-readable medium storing instructions which, when executed by a processing system, cause the processing system to perform instructions for:
   displaying one or more media collections in a user interface display, wherein each of the one or more media collections to include multiple clips of media;
   determining a center media collection from the one or more media collections that corresponds with a slider on the user interface display;
   determining a left media collection based on the center media collection;
   determining a right media collection based on the center media collection;
   playing the multiple clips of media in the center media collection via a center speaker;
   playing the multiple clips of media in the left media collection via a left speaker; and
   playing the multiple clips of media in the right media collection via a right speaker, wherein the multiple clips of media in the center media collection, the left media collection, and the right media collection are configured to be played simultaneously to facilitate a search of the one or more media collections and wherein the multiple clips of media in the center media collection are configured to be played in a first overlapping and cyclical manner with a first selected clip being the focus at a first given time, wherein the multiple clips of media in the left media collection are configured to be played in a second overlapping and cyclical manner with a second selected clip being the focus at a second given time, and wherein the multiple clips of media in the right media collection are configured to be played in a third overlapping and cyclical manner with a third selected clip being the focus at a third given time.

14. The non-transitory machine-readable medium of claim 13, wherein the first selected clip, the second selected clip, and the third selected clip are configured to be played louder than the other clips.

15. The non-transitory machine-readable medium of claim 13, wherein a first audio output at the center speaker, a second audio output at the left speaker, and a third audio output at the right speaker are configured to change based on a position of the slider.

16. The non-transitory machine-readable medium of claim 13, wherein the one or more media collections are displayed in a horizontal format on the user interface display.

17. The non-transitory machine-readable medium of claim 13, wherein the multiple clips of media in each of the media collections are included in a same album and wherein each of the media collections is configured to be represented visually in the user interface display.

18. The non-transitory machine-readable medium of claim 13, wherein the multiple clips of media in each of the media collections are configured to represent content that satisfy a criterion and wherein each of the multiple clips of media is configured to be represented visually in the user interface display.

* * * * *